May 21, 1957 W. SHEPARD, JR., ET AL 2,793,321
CATHODE RAY MULTI-SIGNAL MEASURING AND RECORDING APPARATUS
Original Filed Nov. 26, 1947
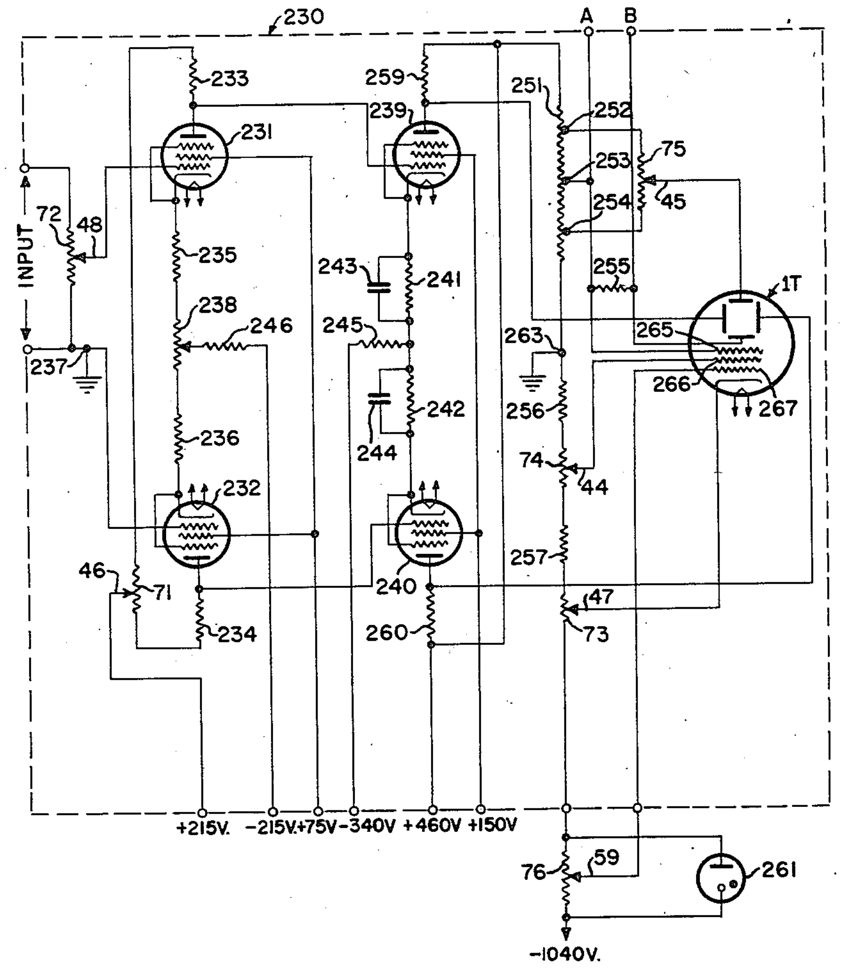
INVENTORS
W. SHEPARD, JR.
M. A. SERRELL
G. L. BEYER, JR.
A. F. ROBERTSON
BY G. H. O'Brien
R. M. Hicks
ATTORNEYS

1

2,793,321

CATHODE RAY MULTI-SIGNAL MEASURING AND RECORDING APPARATUS

Ward Shepard, Jr., Washington, D. C., Morton A. Serrell, Wynnewood, Pa., George L. Beyer, Jr., Washington, D. C., and Alexander F. Robertson, Charlottesville, Va.

Original application November 26, 1947, Serial No. 788,307, now Patent No. 2,680,699, dated June 8, 1954. Divided and this application February 1, 1954, Serial No. 409,278

2 Claims. (Cl. 315—24)

(Granted under Title 35, U. S. Code (1952), sec. 266)

This is a division of application Serial No. 788,037, filed November 26, 1947, now Patent No. 2,680,699.

This invention relates to cathode ray multi-signal apparatus for measuring and recording simultaneous variations in a plurality of signals respectively corresponding to variations in a plurality of quantities.

In accordance with a preferred embodiment of the invention, a plurality of cathode ray tubes are preferably disposed in a row with their fluorescent screens preferably arranged in the same plane; individual amplifiers are associated with the cathode ray tubes whereby the signals control the deflections of the beams in the same plane, for example, the horizontal plane. Calibrating circuits are provided for the amplifiers, and switching means controlled from the film moving means is provided for deflecting the beams off the fluorescent screens except when useful signals are being applied to the amplifiers.

The equipment embodying the subject invention is particularly constructed and arranged to provide portability and economy of size and weight. Special circuits in the amplifiers provide maximum sensitivity and stability with a minimum of component parts.

Another object resides in the provision of a new and improved deflection control amplifier characterized by high sensitivity and fidelity with a minimum of parts, and particularly adapted for use in a portable cathode ray oscilloscope.

Still other objects, advantages, and improvements not specifically set forth hereinbefore will be apparent after a consideration of the following specification taken in conjunction with the accompanying drawing, in which:

The figure is a simplified schematic electrical diagram of one of the deflection amplifier circuits employed with the cathode ray tubes.

Reference is made now to the figure, which shows a simplified schematic electrical diagram of an amplifier circuit and generally designated by the reference numeral 230. As previously stated, one of the objects of the invention is to provide multiple trace cathode ray oscilloscope equipment which is portable and has little weight. To this end, the amplifier circuit of the figure is provided, which represents an improvement over conventional deflection amplifier circuits in that high gain is secured with a limited number of electron discharge tubes, marked stability and freedom from drift are provided, and the amplifier has in the embodiment herein described a uniform response from D.-C. or zero cycles/sec. to 40,000 cycles/sec.

A conventional input gain control potentiometer 72, has one end thereof grounded at 237 and connected to the control grid of an electron discharge tube 232, which may be a pentode known in the trade as type 6SJ7. The arm of the potentiometer is similarly connected to the control grid of another pentode 231 which may be of the type 6SJ7. The input signal is impressed across the entire potentiometer resistance. The suppressor grids of the pentodes are connected to their respective cathodes, and the cathode of tube 231 is connected to resistor 235, thence through the entire resistance of balancing potentiometer 238, thence through resistor 236 to the cathode of tube 232. The anode of tube 231 is connected to resistor 233, thence through the entire resistance of the H-control potentiometer 71, thence through resistor 234 to the anode of tube 232. The arm of potentiometer 71 is connected to the positive terminal of a source of D.-C. potential, which may be of the order of +250 volts to ground, while the arm of potentiometer 238 is connected in series with resistor 246 to the negative terminal of a source of D.-C. potential, which may be of the order of −215 volts to ground. The screen grids of tubes 231 and 232 may be connected together and to the positive terminal of a source of D.-C. potential which may be of the order of +75 volts to ground.

A second stage comprises electron discharge tubes 239 and 240, which may be pentodes of the type known in the trade as 6SH7. The control grid of tube 239 is connected to the anode of tube 231, while the control grid of tube 240 is connected to the anode of tube 232. The suppressor grids of tubes 239 and 240 are connected to their respective cathodes, and the cathode of tube 239 is connected to resistor 241 and thence to resistor 242 and thence to the cathode of tube 240. Resistors 241 and 242 have connected in parallel therewith respectively capacitors 243 and 244. The junction between resistors 241 and 242 is connected through resistor 245 to the negative terminal of a source of D.-C. potential which may be of the order of −340 volts to ground. The anode of tube 239 is connected to resistor 259 and thence to resistor 260 and thence to the anode of tube 240, and the junction between resistors 259 and 260 is connected to the positive terminal of a source of D.-C. potential, which may be of the order of +460 volts to ground. The anode of tube 239 is connected to one of the horizontal deflecting plates of cathode ray tube 1T, while the anode of tube 240 is connected to the other horizontal deflecting plate of tube 1T. The junction point between resistors 259 and 260 is connected to one end of a resistance or voltage divider 251 having points or taps 252, 253, and 254, thence to ground at 263, thence through resistor 256 thence through the entire resistance of focus potentiometer 74 thence through resistor 257 thence through the entire resistance of individual intensity control potentiometer 73 thence through the entire resistance of common intensity control potentiometer 76 to the negative terminal of a source of D.-C. potential, which may be of the order of −1040 volts to ground. Across the ends of potentiometer 76 is connected a gas discharge tube 261.

The arm of individual intensity control potentiometer 73 is connected to the cathode of cathode ray tube 1T. Tube 1T may be of the type known in the trade as a 2BP11, having in addition to a filament, cathode and deflecting plates, three elements 265, 266, and 267 adapted to influence the electron stream. The arm of focus control potentiometer 74 is connected to the element 266 of tube 1T. The arm of common intensity control 76 is connected to element 267 of tube 1T. Element 265 of tube 1T is connected to point 253 on resistor 251, and is further connected through lead A to a beam position switch circuit and is also connected through resistor 255 to the lower one of the vertical deflecting plates of tube 1T. This lower one of the vertical deflecting plates is also connected to the beam position switches. Across points 252 and 254 on voltage divider 251 is connected a position control potentiometer 75, the arm of which is connected to the upper vertical deflection plate of cathode ray tube 1T.

The circuit of tubes 231, 232, 239, and 240 comprises a balanced D.-C. amplifier of high stability. It is noted that tubes 231 and 232 comprise a cathode coupled amplifier, in which phase inversion occurs in the cathode circuits of the tubes. The input stage also provides a balanced amplifier with single ended input; a variation in the plate voltage of the tubes does not cause a change in the output of the stage. It is further noted that the final stage provides a negative feedback arrangement to compensate for losses in high frequencies, the small cathode resistors providing negative current feedback. These resistors 241 and 242 may be of the order of 850 ohms each. They are preferably bypassed as shown by small capacitors 243 and 244 respectively, which may be of the order of 0.01 mfd. each, and which improve the frequency response of the amplifier, which, by suitable choice of component values, may be made to have a flat response from zero to 40,000 C. P. S. In the preferred embodiment hereindescribed, the amplifier provides a voltage gain of approximately 8000.

Whereas the invention has been shown and described with reference to a preferred embodiment thereof which gives satisfactory results, it will be understood by those skilled in the art to which the invention pertains, after understanding the invention, that various changes and modifications may be made without departing from the spirit and scope of the invention, and it is intended, therefore, in the appended claims to include all such changes and modifications.

This invention may be manufactured and used by or for the Government of the United States of America for governmental purposes without the payment of any royalties thereon or therefor.

What is claimed as new and desired to be secured by Letters Patent of the United States is:

1. An amplifier for controlling the deflection voltages on a pair of deflecting plates of a cathode ray tube, said amplifier comprising a first pair of electron discharge tubes, each of said tubes having a control grid, cathode, and anode, an input circuit including a potentiometer across which an input signal is applied, one end of said potentiometer being connected to ground and to the control grid of one of said electron discharge tubes, the arm of said potentiometer being connected to the control grid of the other of said electron discharge tubes, an electrical connection between the anodes of said discharge tubes including in series a load resistor, a first balancing potentiometer, and a second load resistor, a second electrical connection between the cathodes of said electron discharge tubes and including in series a resistor, a second balancing potentiometer, and a second resistor, the arm of said first balancing potentiometer being operatively connected to the positive terminal of a source of D.-C. potential having the negative terminal thereof at ground potential, the arm of said second balancing potentiometer being operatively connected to the negative terminal of a source of D.-C. potential having the positive terminal thereof at ground potential, a second pair of electron discharge tubes each having an anode, control grid, and cathode, the anodes of said first pair of electron discharge tubes being connected to the control grids of the second pair of electron discharge tubes respectively, a third electrical connection between the cathodes of said second pair of electron discharge tubes and including in series a first cathode resistor having a capacitor connected in parallel therewith and a second cathode resistor having a capacitor connected in parallel therewith, the junction between said last named resistors being operatively connected to the negative terminal of a source of D.-C. potential having the positive terminal thereof at ground potential, a fourth electrical connection between the anodes of said second pair of electron discharge tubes and including a pair of additional resistances connected in series, the junction between said last named resistances being operatively connected to the positive terminal of a source of D.-C. potential having the negative terminal thereof at ground potential, and a plurality of additional connections between the anodes of said second pair of electron discharge tubes and the pair of deflecting plates of said cathode ray tube.

2. In combination, a deflection control amplifier circuit of the character disclosed for use with a cathode ray tube, a pair of electron discharge tubes each having an anode, cathode, and control grid, the input signal to said amplifier circuit being applied between the control grids of said electron discharge tubes, load resistors individual to the anodes of said electron discharge tubes, resistance means connecting the cathodes of said electron discharge tubes, means for applying an energizing potential between both said load resistors and a point on said resistance means, a second pair of electron discharge tubes each having an anode, cathode, and control grid, the control grids of said second pair of electron discharge tubes being directly connected to the anodes of said first pair of electron discharge tubes respectively, two parallel R–C circuits arranged in series and connecting the cathodes of said second pair of electron discharge tubes, means for energizing said second pair of electron discharge tubes, and a utilization circuit connected across the anodes of said second pair of electron discharge tubes.

References Cited in the file of this patent

UNITED STATES PATENTS

| | | |
|---|---|---|
| 2,207,499 | Vance | July 9, 1940 |
| 2,321,581 | Conover | June 15, 1943 |
| 2,406,382 | Kellogg | Aug. 27, 1946 |
| 2,414,486 | Ricke | Jan. 21, 1947 |
| 2,543,434 | Bryan et al. | Feb. 27, 1951 |
| 2,568,449 | Hansen | Sept. 18, 1951 |
| 2,604,609 | Wilson | July 22, 1952 |
| 2,612,621 | Shepherd | Sept. 30, 1952 |
| 2,629,006 | Oliver | Feb. 17, 1953 |